April 20, 1948.　　　S. S. BAKER ET AL　　　2,440,038
UNIDIRECTIONAL LOCKING APPARATUS
Filed Aug. 25, 1945　　　2 Sheets-Sheet 1
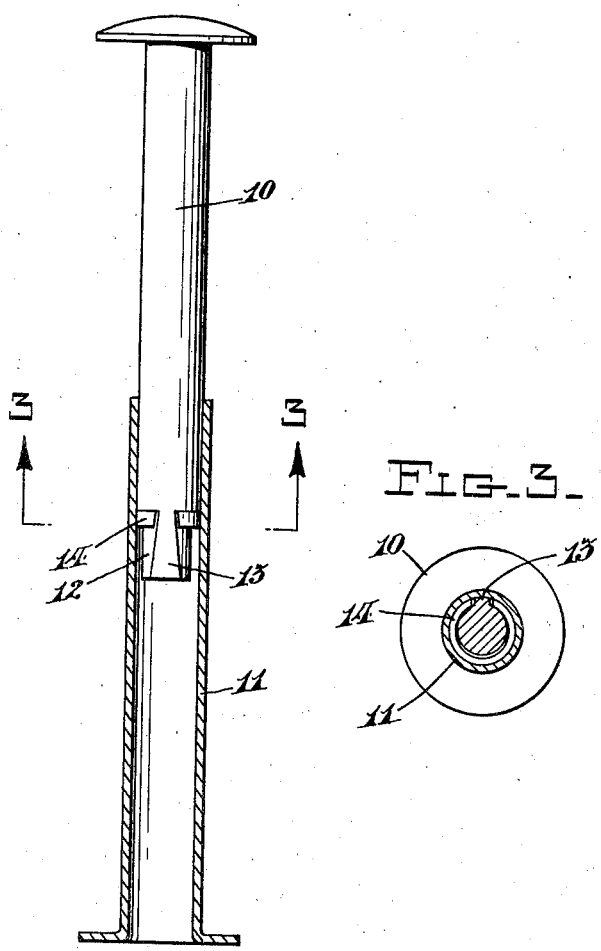
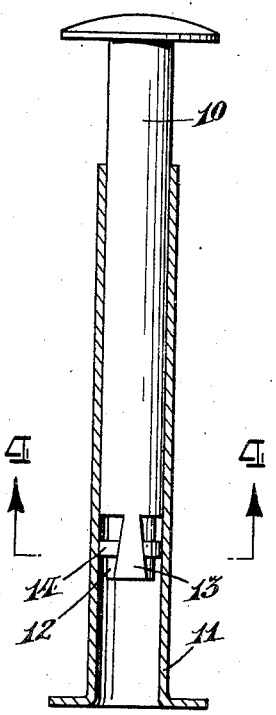
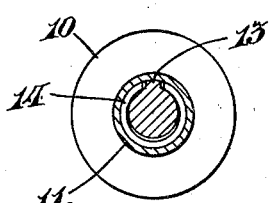
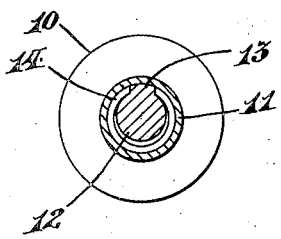
INVENTORS
Samuel Stephen Baker
BY Raymond F. Batchelar
S. S. Baker
ATTORNEY April 20, 1948.  S. S. BAKER ET AL  2,440,038
UNIDIRECTIONAL LOCKING APPARATUS
Filed Aug. 25, 1945  2 Sheets—Sheet 2
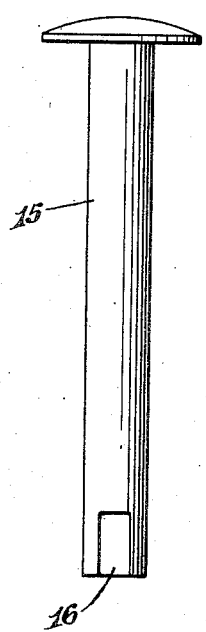
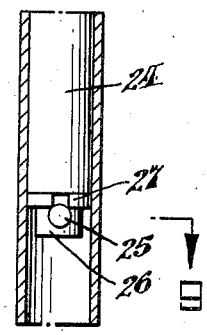
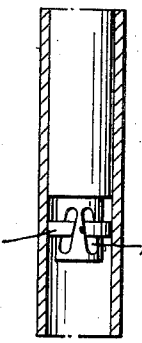
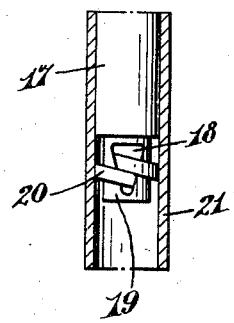
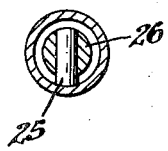

Patented Apr. 20, 1948

2,440,038

UNITED STATES PATENT OFFICE 2,440,038

UNIDIRECTIONAL LOCKING APPARATUS

Samuel Stephen Baker, Eatontown, and Raymond F. Batchelar, Hillsdale, N. J., assignors to American Loose Leaf Corporation Application August 25, 1945, Serial No. 612,694

4 Claims. (Cl. 85—5)

Our invention relates to locking devices and more particularly to telescopic members adapted for uni-directional relative movement.

In many prior devices wherein telescoping action between two cylinders is permitted in one direction and resisted in the opposite direction, such resistance or locking as it may be called, was produced by means of a wedge which served to force a movable member to grip the outer tube through a jamming action so that the wedge, movable member, and outer tube jointly assume a tightly packed state. It has been found, however, that this action often causes freezing of the telescoped members so as to render their release difficult. A further disadvantage of such device is the damage to the outer cylinder caused by the biting pressure of the movable member. The present invention has, therefore, as one of its objects, the provision of a locking device which shall not rely upon jamming action to secure the desired locking effect so that the freezing of the locked members is prevented and the relation of the locking means thereto is such that release of the locking means is facilitated. It may also be noted that the life of such devices is prolonged by avoiding damage to the members through such gripping as above described and that frequent and prolonged operation of the device is possible before its usefulness is destroyed.

Another object of this invention is to provide telescoping members adapted for particularly smooth and free sliding movement in one direction and locked against relative movement in the opposite direction.

Another object of this invention is to provide a locking mechanism of extreme simplicity and permitting considerable manufacturing economies both in the materials used and in the ease of their assembly.

Other objects of this invention will be apparent from the following description it being understood that the above general statements of the objects of this invention are intended to describe and not to limit it in any manner.

Referring to the drawings:

Fig. 1 is an elevational view of the locking device applied to telescoping members, the locking means being shown in the inactive position.

Fig. 2 is a similar view the locking means being in position to lock the members against relative outward movement.

Fig. 3 is a cross sectional view along the line 3—3 of Fig. 1.

Fig. 4 is a cross sectional view along the line 4—4 of Fig. 2.

Fig. 5 is an elevational view of the releasing implement.

Fig. 6 is a fragmentary view of a modification of the invention.

Fig. 7 is a similar view of another modification of the invention.

Fig. 8 is a similar view of a third modification of the invention.

Fig. 9 is a cross sectional view along the line 9—9 of Fig. 8.

The combination of the cylindrical penetrating member 10 and the tubular female member 11 is found in many environments where slidable action is required between two objects. An example of such use is found in loose leaf binders although the invention is obviously applicable to many other devices wherein coupling is required as will hereinafter appear.

Penetrating member 10 is formed with a reduced, cylindrical end 12. A cam piece 13 is formed on the end 12 so as to be integral therewith, the cam piece tapering from a narrow base to a wide extremity. However, it is not necessary that the cam piece be integral as described since it is feasible to form a transverse hole in the end 12 and plug the cam piece therein.

A locking ring 14 is slidably mounted on the end 12. Ring 14 has an arcuate portion thereof cut out so that two ends are formed which are available for camming engagement with cam piece 13. The open ends of ring 14 are respectively disposed on both sides of cam piece 13 in order that separation of the ends may be accomplished to a degree depending upon the position of the ring on the end 12.

Ring 14 has a normal diameter substantially equal to the inner diameter of tubular member 11, while the base of the cam piece 13 is narrower than the cut-out of the ring 14, so that the normal diameter of the ring is undisturbed when it rests at the base of the cam piece 13. This condition is illustrated in the cross sectional view of Fig. 3 wherein the ends of the ring 14 are shown spaced slightly from the cam piece 13 whereas the body of the ring is loose or spaced very slightly from the end 12.

Since the normal diameter of the ring is equal to the inner diameter of the member 11, the penetrating member 10 may be easily inserted or telescoped into the member 11 to any desired extent, the contact of the ring 14 with the inner wall of member 12 serving to maintain the ring at the base of the cam piece 13 during insertion. However, whereas inward movement is unresisted, reverse or disengaging movement of the members is prevented because such movement causes the movable ring to ride up to the wider extremity of cam piece 13 so as to separate the ends of the ring 14. Accordingly, and as shown in the cross sectional view of Fig. 4, the body of the ring expands and increases its diameter while the diameter of the end 12 remains constant so that the ring 14 does not adhere to the periphery of reduced end 12 but departs radially therefrom as its ends are forced apart. Jamming of the elements is thus prevented since the ring 14 is expanded by the localized cam piece which acts upon its ends rather than by an expanding force which acts centrally of the ring as would a central wedge. It will be observed that whereas the expanding means acts locally on the ring 14, the effects thereof are substantially circumferentially distributed because the ring more or less retains its circular character. The ring 14 is preferably, but not necessarily, polygonal in cross section since engagement with both the cam means and the tubular members 11 is rendered more positive thereby.

Releasing means are provided in the form of key 15 which is adapted to be inserted in the open end of tubular member 11. Key 15 is formed with a slot opening 16 of substantially the same width as that of the outer extremity of cam piece 13. Penetrating member 10 may thus be released by inserting key 15 into tube 11 so that the slot 16 fits over the cam piece 13 and forces the ring 14 downwardly. Thereafter, the key 15 is pushed whereupon the member 10 will be forced outwardly until it is free of the tube 11. This action is facilitated by the space between the end 12 and ring 14 inasmuch as this provides more room for insertion of the key 15.

In the embodiment of Fig. 6, the penetrating member 17 has a triangular slot 18 formed in its head 19. The ring 20 has overlapping ends bent downwardly into the slot 18 so as to be disposed for camming engagement with the sides of the slot. It will be apparent that when the member 17 is pushed into the tube 21, the ring ends are urged into the wider portion of the slot 20 so as to increase the degree of overlap and maintain the diameter of the ring 20 at its minimum. Conversely, any attempted outward movement will bring the ends together so as to increase the diameter of the ring and cause the gripping of the tube 21.

In Fig. 7, the ring 22 is split and has ends bent downwardly into the diverging slots 23 so as to be subjected to camming action by the slots. It will be observed that the direction of the divergence differs as regards the respective cam slots of Figs. 6 and 7, the difference being reconciled by the relation of the ring ends, that is, overlapping in one case and opposing in the other. Release of the penetrating member may be effected in a manner similar to that shown in the embodiment of Figs. 1 to 4 with a key adapted to fit over the reduced ends of the penetrating members.

In the embodiment of Figs. 8 and 9, the ring 27 is of the same character as that shown in Figs. 1 to 4. An arcuate cam member in the form of a cylindrical plug 25 is disposed in an opening formed in the reduced end member 26. Cam 25 may have a small portion of its circumference normally embraced by the spaced open ends of ring 27, the arcuate divergence of the cam as the ring is forced upwardly, causing the ring to increase its effective diameter and grip the outer tube. This action is enhanced by a cocking effect produced on the ring depending upon its internal diameter with respect to the diameter of end member 26. While the ring moves slightly upwardly, its open ends always embrace less than one-half the circumference of the plug so that escape of the ring from the end is prevented.

A particular advantage of the plug type cam member 25 is that it may be of hardened material, such as would be produced by case hardening, and its insertion by frictional drive means in the end member 26, provides an excellent wearing cam surface capable of very frequent and prolonged use while the remainder of the device may be of inexpensive steel or similar material. The releasing implement may, of course, be similar to that shown in Fig. 5.

We have shown a preferred embodiment of our invention but it is obvious that numerous changes and omissions may be made without departing from its spirit. For example, while I have illustrated the ring 14 as constituting a narrow band, it is feasible to increase its height until it resembles a split collar whereby a larger gripping surface may be obtained.

We claim:

1. Uni-directional locking means for a penetrating member telescoped in a tubular female member, said locking means comprising a split ring on said penetrating member and an arcuate, raised cam member disposed on said penetrating member and adapted to act upon the open ends of said split ring, said arcuate cam member having a portion thereof disposed between said open ends and arcuately diverging beyond said ends, said ring having a normal outer diameter substantially equal to the inner diameter of said female member whereby force applied to said female member in a given direction is imparted to said split ring in the same direction so that attempted movement of said female member in the direction of said arcuate divergence causes said split ring to expand its effective diameter and grip said female member, and so that an opposite force applied to said female member actuates said split ring away from the direction of said arcuate divergence and collapses said ring so as to release said grip.

2. Uni-directional locking means for a penetrating member telescoped in a tubular member, said locking means comprising a split ring having spaced open ends disposed around said penetrating member, said penetrating member being formed with an opening therein and a plug disposed in said opening so as to provide a raised cam surface for co-action with and located between said spaced open ends, said raised cam surface having diverging cam faces so that movement of said split ring relative thereto and in the direction thereof causes the increase of the effective diameter of said split ring, and means for imparting to said split ring movement of said tubular member relative to said penetrating member in said direction whereby said split ring is expanded and resists continued movement by gripping said tubular member and whereby movement of said tubular member in the opposite direction withdraws said split ring from said cam faces so as to collapse the ring and release its grip on said tubular member.

3. A device according to claim 2 wherein said plug and opening are arcuate and said spaced ends embrace a greater portion of the circumference of said plug when in locked position than in unlocked position, said embracing being confined to less than one-half the circumference of the plug.

4. A device according to claim 2 wherein said plug is hardened in respect to said penetrating member so as to resist wearing of its cam faces through the movement of said split ring.

SAMUEL STEPHEN BAKER.
RAYMOND F. BATCHELAR.

REFERENCES CITED

The following references are of record in the file of this patent:

UNITED STATES PATENTS

| Number | Name | Date |
|---|---|---|
| 433,585 | Adams | Aug. 5, 1890 |
| 966,515 | Baker | Aug. 9, 1910 |
| 2,058,718 | Peterson | Oct. 27, 1936 |
| 2,382,947 | Brozek | Aug. 14, 1945 |